June 20, 1950  C. M. CERVIN  2,512,089
FOWL-SLAUGHTERING KNIFE
Filed Oct. 6, 1947
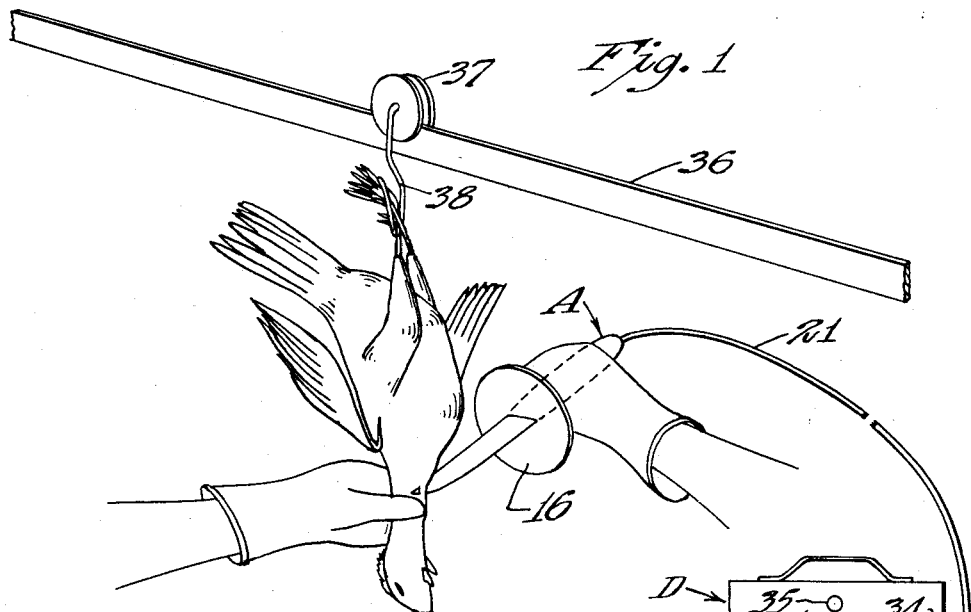
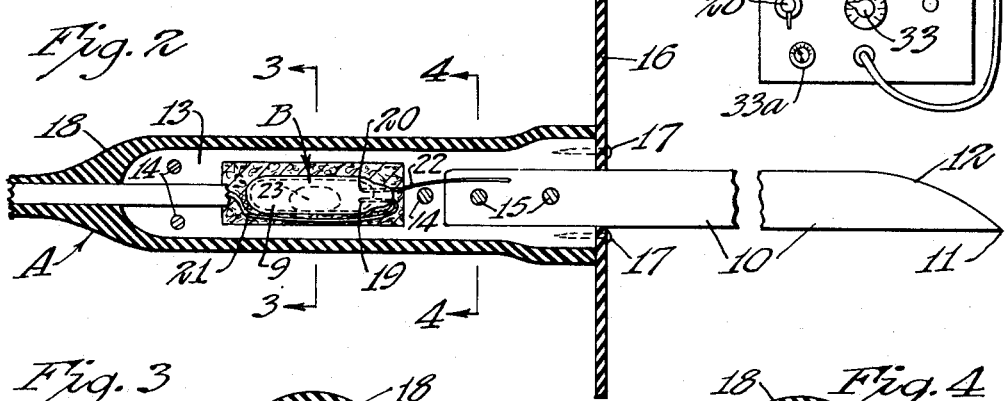
Inventor
Curtis M. Cervin
By Williamson & Williamson
Attorneys Patented June 20, 1950

2,512,089

UNITED STATES PATENT OFFICE 2,512,089

FOWL-SLAUGHTERING KNIFE

Curtis M. Cervin, Minneapolis, Minn.

Application October 6, 1947, Serial No. 778,081

7 Claims. (Cl. 17—11)

This invention relates to fowl-slaughtering knives.

The slaughtering of fowl is a difficult and messy job. This is particularly true where large numbers of fowl are killed as in packing houses and the like.

It is necessary that the fowl be bled immediately after being killed to prevent spoiling of the meat. Therefore, it is desirable to sever a primary vein and a main artery to insure complete bleeding. The carotid artery and jugular vein cross just above the crop in the neck of the fowl and it has been found efficient and convenient to sever these two vessels with a single cutting motion at this point. When these blood vessels are cut the fowl bleeds considerably.

As a fowl is killed normally, a muscular reaction takes place resulting in what is herein referred to as death spasms, at which time, the fowl flops around, its wings flapping and legs moving.

These death spasms are undesirable for two reasons: (1) the fowl may become bruised, injuring the meat thereon and (2) the blood from the fowl is spread around, getting all over the man slaughtering the bird and all over the slaughtering room.

It is an object of my invention to provide a novel and simple fowl-slaughtering knife adapted to initially shock and stun a fowl and to cut, kill and bleed said fowl by a single, continuous thrusting motion of the knife.

It is a further object to provide a slaughtering knife which is adapted to electrically shock and stun a fowl as the knife is initially applied thereto, preventing any death spasms when the fowl is killed and bled by the thrust of said knife.

It is another object to provide a fowl-slaughtering knife which, as it is initially applied to the fowl is adapted to give the fowl a paralyzing electric shock causing the feathers of said fowl to distend and stand substantially upright to permit a subsequent scalding operation to be carried out more efficiently.

The above and other objects and advantages of the invention will more fully appear from the following description made in connection with the accompanying drawings, wherein like reference characters refer to the same or similar parts throughout the views and in which:

Fig. 1 is a perspective view showing a fowl as it is suspended from a carriage and the knife in operating position, with the operator holding the neck of the fowl;

Fig. 2 is a longitudinal sectional view taken substantially through the center of the knife, parallel with the blade;

Fig. 3 is a transverse, sectional view taken substantially on the line 3—3 of Fig. 2;

Fig. 4 is a transverse, sectional view taken substantially on the line 4—4 of Fig. 2; and Fig. 5 is a diagrammatic view of the electric circuit.

In packing houses and the like, fowl to be slaughtered are suspended head-down from an overhead conveyor such as is shown in Fig. 1.

My invention comprises a knife designated as an entirety by the letter A, including an electric switch designated as B contained in the handle of said knife, and a variable transformer designated as an entirety by the letter C.

The knife A comprises a blade 10 having a pointed end 11 and a sharpened cutting edge 12 adjacent said pointed end. A sectional handle 13 is fixed to the opposite end of said blade 10 and is held together as by screws 14. The blade 10 is retained in said handle by transverse pins 15. The sectional handle is made from any insulating material such as wood, rubber or the like. A transverse rubber guard shield 16 in the form of a disc, having a slot cut in the middle thereof to surround and tightly embrace said blade 10 is fixed on the end of said handle 13 adjacent the connection between said blade and said handle. As illustrated, the guard 16 has a smooth, forward surface which causes blood or other liquid to readily drip therefrom, without collecting. This guard 16 is fastened to said handle by two screws 17 as shown in Fig. 2. A rubber insulating casing 18 is slipped over said sectional handle 13 to completely surround and tightly embrace said sectional handle 13 having its forward end abut the said rubber guard 16. This provides complete insulation for said handle.

The sectional handle 13 is recessed in the center thereof to receive the gravity-actuated switch B which, in the form shown, is a mercury switch. Said switch B comprises a sealed insulated tubular capsule 9 forming a chamber and made as from glass, a pair of terminals 19 and 20 mounted in sealed relation at the forward end of said tube in closely spaced, opposing relation to each other. As shown in Fig. 2, terminal 19 is connected with a source of electricity by conductor 21. Terminal 20 is connected with the knife blade 10 by a conductor 22. A globule of mercury 23 is contained in said capsule 9. When the knife is pointed downwardly, the force of gravity urges said globule toward the lower end of said capsule 9, surrounding terminals 19 and 20, thus making contact between said terminals. It will be seen that unless the knife is pointed downwardly the force of gravity will prevent the globule of mercury 23 from surrounding the terminals 19 and 20 and the switch will remain open.

The variable transformer C includes a primary winding 24, a core 25 and secondary windings 26 and 27 and is mounted for convenience on a panel D. The primary winding 24 is in a supply circuit controlled by a switch 28 and running from a source of electrical supply such as the line wires 29 and 30. The secondary winding 26 is connected to one end of a variable resistance 31 which in turn, is connected to a fixed resistance 32, the other end of which is grounded. A movable contact 33 engages selectively with the resistance 31 so as to form in effect, a potentiometer variably controlling the flow of current from the secondary winding of a transformer. From the movable contact 33, the conductor 21 runs to the terminal 19 of the mercury switch B, a fuselight 34 being in series with the switch B. A volt meter 33a is connected in parallel with the circuit through the knife A and has a rectifier tube 33b to rectify the circuit flowing through said meter 33a. This volt meter is mounted on the panel D where it can be easily read by the operator and indicates the maximum voltage available for the knife circuit through the bird to be stunned and subsequently killed. The voltage may be varied by moving the contact 33 of the potentiometer. The secondary winding 27 is connected in series with an indicator light 35.

In slaughtering a large number of fowls as in a slaughtering house or the like, the fowls are normally individually suspended head-downward from a conveyor and advanced one by one while still alive to the slaughtering station. In Fig. 1 of the drawings, portions of a typical conveyor are shown which include a track 36 which is grounded, a grooved roller 37 riding on the track and a hook 38 suspended in downwardly depending relation from the roller, the hook and roller being in electrical contact with track 36. There is shown a fowl suspended by its feet from the hook 38 and it will be assumed that this fowl, while still alive, is being advanced to the slaughtering station.

The circuit, through conductor 21, the switch B and knife blade 10 passes through the downwardly depending fowl through the hook 38 and grooved roller 37 to the track 36, which is grounded.

The man who is to slaughter the fowl at the slaughtering station will wear rubber gloves as illustrated, and as the fowl, suspended by the conveyor, arrives at the slaughtering station, the slaughterer grasps the neck of the fowl at the crop by the thumb and forefinger of the left hand and distends the jugular vein and the carotid artery from the crop of the fowl at the point where they cross. Holding the fowl-slaughtering knife in his right hand with the pointed end of the blade downwardly inclined, the slaughterer brings the point 11 of the blade in contact with the fowl immediately behind the position where the jugular vein and the carotid artery cross and then with a continuous motion, he swings the handle end of the knife downwardly to carry the point of the blade upwardly, stabbing and cutting through the fowl at the neck portion thereof and severing both the jugular vein and the carotid artery.

Inasmuch as the knife is pointed downwardly when the point 11 of the blade first contacts the fowl, a circuit will be established from the secondary winding 26 of the transformer through the potentiometer and the mercury switch B and the knife blade 10, through the fowl to ground through the conveyor. The variable resistance 31 will be so adjusted that the flow of current is just sufficient to stun the fowl without killing the fowl, and thus, as the tip 11 of the blade first comes in contact with the fowl, the fowl will be immediately stunned before it is cut and bled. As the fowl is stunned, it will quiver and the feathers of the fowl will distend from the shock imparted to the fowl. As the fowl is cut and bled by the thrust of the knife, the pointing of the knife upwardly will break the circuit from the secondary of the transformer, and as the fowl is killed, the shock imparted to the fowl initially will prevent any death spasm, and thus, the fowl will be painlessly killed and will be bled without causing the normal muscular reaction that will naturally result when a shock is not first imparted to the fowl. The instantly actuated (preferably gravity-controlled) switch mounted in the handle, is an important factor in combination with the other features of the invention. With the light, portable construction of the knife and handle, it enables the entire attention of the slaughterer to be concentrated upon the fowl, the current being connected the instant the blade is pointed slightly downwardly from horizontal position.

My rather large guard 16 constructed of smooth insulating material such as rubber and maintained in operation approximately in vertical position, prevents accumulation and clotting of blood and other fluids thereon, thereby substantially eliminating danger of short circuits which might otherwise be caused by the contact of an ungloved operator's hand with the blood or fluid on the guard.

It is necessary to very accurately control the amount of current passing through a fowl. If too much current is used, the electric shock will coagulate the blood, thereby restricting the flow of blood so as to prevent proper bleeding of the fowl. If too little current is used, the fowl will not be stunned and paralyzed to prevent the undesirable death spasms hereinbefore referred to. It has been found that substantially less current should be used for smaller birds than is used on the larger ones.

After the bird has been killed and bled, it is dipped into scalding water to facilitate the plucking process. By distending the feathers with the electric shock, this scalding process is much more efficient and enables the feathers to be more easily plucked.

As shown in Fig. 1, the current supply switch 28, a variable transformer including the variable resistance 31, indicator light 35 and fuse light 34 are all mounted in a rectangular box which can be easily moved about at the slaughtering station.

It will be seen that an effective fowl-slaughtering knife has been provided which, with a continuous, single thrusting motion, efficiently stuns the fowl to prevent final death spasms and kills and bleeds, while stunned, by severing the carotid artery and jugular vein.

It will, of course, be understood that various changes may be made in the form, details, arrangement and proportions of the parts without departing from the scope of my invention.

What I claim is:

1. A fowl sticking and paralyzing device comprising an elongated, metallic element terminating at one end in a sticking point, an insulating handle fixed to the opposite end of said element and having an electrical conductor extended therethrough in connectible relation to said element, means flexibly connecting said conductor with a source of electricity, said element and handle being easily manipulatable as a unit, said handle being provided with an elongated chamber having two terminals extending thereinto, one connected to said metallic element and the other connected to said conductor, and movable switch means in said chamber whereby contact between the terminals may be made and broken upon movement of the device by the operator.

2. A fowl sticking and paralyzing device comprising an elongated, metallic element terminating at one end in a sticking point, an insulating handle fixed to the opposite end of said element and having an electrical conductor extended therethrough in connectible relation to said element, means flexibly connecting said conductor with a source of electricity, said element and handle being easily manipulatable as a unit, said handle being provided with an elongated chamber having two terminals extending thereinto, one connected to said metallic element and the other connected to said conductor, and movable switch means in said chamber whereby when the device is in one position the movable switch means will make contact between said terminals, and when the device is in another position said contact will be broken.

3. A fowl sticking and paralyzing device comprising an elongated, metallic element terminating at one end in a sticking point, an insulating handle fixed to the opposite end of said element and having an electrical conductor extending therethrough in connectible relation to said element, means flexibly connecting said conductor with a source of electricity, said element and handle being easily manipulatable as a unit, said handle being provided with an elongated chamber having two terminals extending thereinto, one connected to said metallic element and the other connected to said conductor, and movable means in said chamber whereby when the device is positioned with the terminals in the lower end of the chamber the movable means will make contact between said terminals.

4. A fowl sticking and paralyzing device comprising an elongated, metallic element terminating at one end in a sticking point, an insulating handle fixed to the opposite end of said element and having an electrical conductor extended therethrough in connectible relation to said element, means flexibly connecting said conductor with a source of electricity, said element and handle being easily manipulatable as a unit, said handle being provided with an elongated chamber having two terminals extending thereinto, one connected to said metallic element and the other connected to said conductor, movable means in said chamber whereby when the device is positioned with the terminals in the lower end of the chamber the movable means will make contact between said terminals, and a large di-electric guard shield of an area greater than the cross sectional shape of an operator's closed hand and disposed at the forward end of said handle surrounding said metallic element and having a smooth forward surface adapted to readily shed blood and other liquids.

5. A fowl sticking and paralyzing device comprising an elongated, metallic element terminating at one end in a sticking point, an insulating handle fixed to the opposite end of said element and having an electrical conductor extended therethrough in connectible relation to said element, means flexibly connecting said conductor with a source of electricity, said element and handle being easily manipulatable as a unit, said handle being provided with an elongated chamber having mounted at one end thereof at said opposite end of said metallic element two terminals extending thereinto, one connected to said metallic element and the other connected to said conductor, and a globule of mercury in said chamber whereby when the device is positioned with the terminals in the lower end of the chamber the globule of mercury will make contact between said conductors.

6. A fowl paralyzing and slaughtering knife comprising an elongated blade having a pointed outer end and a cutting edge, an insulating handle at the opposite end of the blade, the inner end portion of said blade extending into the forward part of the handle and secured thereto, an electrical conductor in the handle rearwardly of and spaced from the inner end of said blade, means extending from the outer end of the handle for flexibly connecting said conductor with a source of electricity, the blade and handle being readily manipulatable as a unit, said handle being provided with an elongated chamber having at one end thereof two terminals extending thereinto, one connected to said metallic element and the other connected to said conductor, and movable means in said chamber whereby when the knife is positioned with the terminals in the lower end of said chamber, said movable means will make contact between said terminals.

7. A fowl sticking and paralyzing device comprising an elongated, metallic element terminating at one end in a sticking point, an insulating handle at the opposite end of said element, the inner end portion of said element extending into the forward part of the handle and secured thereto, an electrical conductor in the handle located rearwardly of and spaced from the inner end of said metallic element, means flexibly connecting said conductor with a source of electricity, said element and handle being easily manipulatable as a unit, said handle being provided with an elongated chamber having at one end thereof at said opposite end of said metallic element two terminals extending thereinto, one connected to said metallic element and the other connected to said conductor, and a globule of mercury in said chamber whereby when the device is positioned with the two terminals in the lower end of the chamber, the globule of mercury will make contact between said terminals.

CURTIS M. CERVIN.

REFERENCES CITED

The following references are of record in the file of this patent:

UNITED STATES PATENTS

| Number | Name | Date |
|---|---|---|
| 2,129,968 | Sargent et al. | Sept. 13, 1938 |
| 2,138,279 | Kneisley | Nov. 29, 1938 |
| 2,245,880 | Tipton et al. | June 17, 1941 |

FOREIGN PATENTS

| Number | Country | Date |
|---|---|---|
| 667,201 | Germany | Nov. 7, 1938 |